United States Patent
Schnell et al.

(10) Patent No.: US 6,722,390 B2
(45) Date of Patent: Apr. 20, 2004

(54) HYDRAULIC DOUBLE VALVE

(75) Inventors: Richard E. Schnell, Oswego, IL (US); Hubert Schaber, Rutesheim (DE)

(73) Assignee: Ross Operating Valve Company, Troy, MI (US)

(*) Notice: Subject to any disclaimer, the term of this patent is extended or adjusted under 35 U.S.C. 154(b) by 99 days.

(21) Appl. No.: 10/139,599

(22) Filed: May 6, 2002

(65) Prior Publication Data

US 2003/0005963 A1 Jan. 9, 2003

Related U.S. Application Data (60) Provisional application No. 60/288,853, filed on May 4, 2001.

(51) Int. Cl.$^7$ ................................................ F15B 20/00
(52) U.S. Cl. ...................................... 137/596.16; 91/424
(58) Field of Search ........................... 91/424; 137/596.16

(56) References Cited

U.S. PATENT DOCUMENTS

| | | |
|---|---|---|
| 1,290,865 A | 1/1919 | Anthony |
| 2,051,732 A | 8/1936 | McKee |
| 2,593,564 A | 4/1952 | Ives |
| 2,906,246 A | 9/1959 | Tirro et al. |
| 2,954,009 A | 9/1960 | Juilfs |
| 2,995,141 A | 8/1961 | Hipp |
| 3,139,109 A | 6/1964 | Ruchser |
| 3,280,951 A | 10/1966 | Jordan |
| 3,371,759 A | 3/1968 | Sapolsky |
| 3,670,767 A | 6/1972 | Mahorney |
| 3,757,818 A | 9/1973 | Sweet |
| 3,834,621 A | 9/1974 | Pacht et al. |
| 3,858,606 A | 1/1975 | Cameron |
| 4,075,928 A | 2/1978 | Bitonti |
| 4,181,148 A | 1/1980 | Russell et al. |
| RE30,403 E | 9/1980 | Bitonti |
| 4,257,455 A | 3/1981 | Cameron |
| 4,345,620 A | 8/1982 | Ruchser et al. |
| 4,353,392 A | 10/1982 | Ruchser et al. |
| RE31,161 E | 3/1983 | Mahorney |
| 4,542,767 A | 9/1985 | Thornton et al. |
| 4,903,727 A | 2/1990 | Motzer |
| 4,903,728 A | 2/1990 | Motzer |
| 4,903,729 A | 2/1990 | Motzer |
| 5,113,907 A | 5/1992 | Russell |
| 5,906,246 A | 5/1999 | Mensa-Wilmot et al. |
| 5,927,324 A | 7/1999 | Russell et al. |
| 6,155,293 A | 12/2000 | Haselden, Jr. et al. |

FOREIGN PATENT DOCUMENTS

| | | |
|---|---|---|
| DE | 1099294 | 8/1961 |
| DE | 38890 | 8/1965 |
| DE | 41174 | 11/1965 |
| DE | 2750985 A1 | 5/1979 |
| DE | 3032336 A1 | 3/1981 |
| DE | 1 249 040 | 9/1986 |
| DE | 86 12453 | 9/1986 |
| DE | 90 14 789.8 | 3/1991 |
| GB | 1294747 | 11/1972 |
| GB | 2010448 A | 6/1979 |
| GB | 2057638 A | 4/1981 |

OTHER PUBLICATIONS

Search Report for EP 97 12 0203.

*Primary Examiner*—Gerald A. Michalsky
(74) *Attorney, Agent, or Firm*—Gael Diane Lindland, Esq.

(57) ABSTRACT

A control valve system in which main valves are actuated and deactuated by operation of pilot valves. Actuation of pilot valves causes actuation of the main valves, which enables fluid pressure to be output from the control valve system. The main valves must shift within a predetermined time period in order to prevent an error condition. A timing chamber stores a predetermined amount of fluid to define a time period in which the main valves must shift.

23 Claims, 12 Drawing Sheets

HYDRAULIC DOUBLE VALVE

CROSS-REFERENCE TO RELATED APPLICATIONS

This application claims the benefit of U.S. Provisional Application No. 60/288,853, filed May 4, 2001. The disclosure of the above application is incorporated herein by reference.

FIELD OF THE INVENTION

The present invention relates to a control valve. More particularly, the present invention relates to a fluid control valve including a timing chamber to cause individual main elements of the valve to shift within a predetermined time period and, when an abnormal situation is encountered, to move to a locked out position which requires a reset operation before the control valve will again function.

BACKGROUND AND SUMMARY OF THE INVENTION

Machine tools of various types operate through a valving system which interacts with a pneumatically or hydraulically controlled clutch and/or brake assembly. For safety reasons, the control valves which are used to operate these machine tools require the operator to actuate two separate control signal applying contacts essentially simultaneously. This requirement of simultaneous application ensures that the operator will not have their hand near the moving components of the machine tool when an operating cycle is initiated. The two control signal applying contacts can then be connected to the valving system which allows compressed air or hydraulic fluid pressure to be delivered to the machine tool to perform its operating cycle.

Safety rules and regulations require the valving system to be designed such that if a component in the valving system malfunctions, the valving system will not allow additional movement of the machine tool. In addition, the valving system must ensure that a new operation cycle of the machine tool cannot be initiated after a component of the valving system has become defective. Some safety regulations also require that each element of the control valve cycle each time the clutch and or brake assembly is cycled. Such a valve is typically referred to as a dynamic control valve.

Prior art electromagnetic valving systems utilized for the operation of machine tools meet these safety requirements through the use of a double valve assembly. The double valve assembly includes two electromagnetic supply valves which are normally closed. Each of the supply valves is moved to an open position in response to an electrical control signal. The two supply valves are arranged in series with respect to the source of compressed air or fluid pressure. The double valve assembly also includes two exhaust valves that are normally open. Each exhaust valve is closed by a respective supply valve when it is opened. It is therefore necessary for the supply valves to be opened simultaneously, otherwise supply air will be exhausted from the system through one of the exhaust valves. The opening and closing of the valve units is monitored by sensing air pressures in the respective valve units and then comparing these two pressures. The monitoring and comparing of these two pressures is accomplished by using a single air or fluid cylinder which is separated into two chambers by a piston. The pressure in each valve unit is delivered to one of the chambers. Thus, unequal pressures in the valve units will cause movement of the normally static piston which will then interrupt the electrical signal to one of the valve units. This and other external electronic monitoring arrangements are expensive and require that electrical signal processing equipment be designed and utilized.

The continued development of the valving systems for machine tools has been directed toward more reliable, simpler, and less costly valving systems which both meet and exceed the safety performance requirements in force today as well as those proposed for the future.

The present invention provides the art with a control valve system which operates entirely hydraulically or pneumatically, thus eliminating the need for electrical monitoring and the associated controls. The control valve system includes a plurality of valves each of which open or close during the actuation or deactuation of the valves. The control valve system monitors the dynamic movement of the various valves of the system to ensure the proper functioning of the control valve system. The control valve system moves to a locked out position upon sensing a malfunction and remains in this locked out position until a resetting operation is performed. Thus, the operation of the control assembly is totally dynamic and the system does not rely on the monitoring of a static member to ensure its proper function.

Other advantages and objects of the present invention will become apparent to those skilled in the art from the subsequent detailed description, appended claims and drawings.

BRIEF DESCRIPTION OF THE DRAWINGS

The drawings, which form an integral part of the specification, are to be read in conjunction therewith, and like reference numerals are employed to designate identical components in the various views.

DETAILED DESCRIPTION OF THE PREFERRED EMBODIMENTS

Referring now to the drawings in which like reference numerals designate like or corresponding parts throughout the several views, there is shown in FIGS. 1 thru 6 a control valve system in accordance with the present invention which is designated generally by the reference numeral 10. Control valve system 10 is shown as a schematic fluid circuit. The circuit may be either a hydraulic or a pneumatic circuit, but will be described herein as a hydraulic circuit.

Figure 1A:
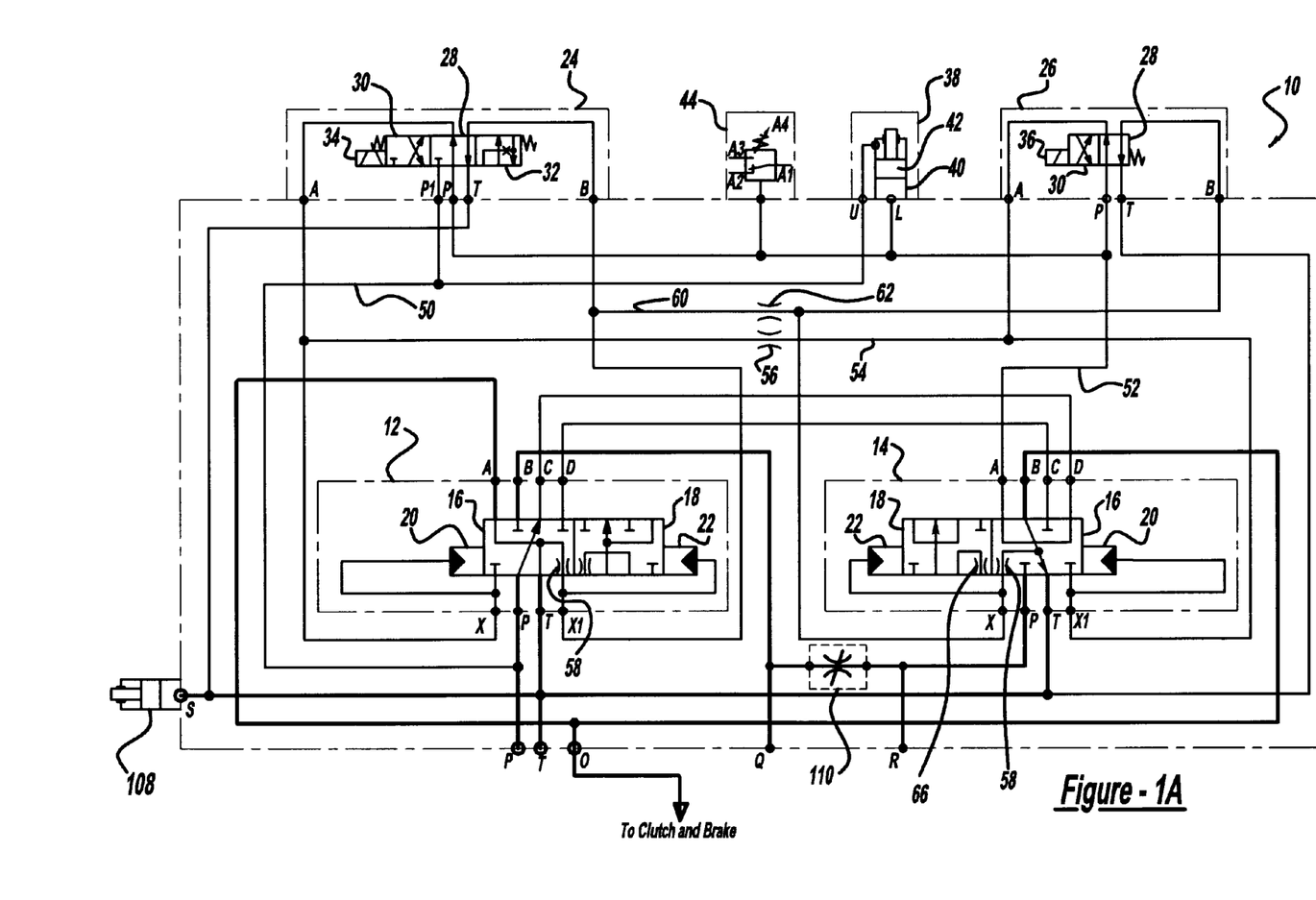
FIG. 1A is a schematic circuit diagram of the control valve system of the present invention shown in a deactuated position.
Figure 1B:
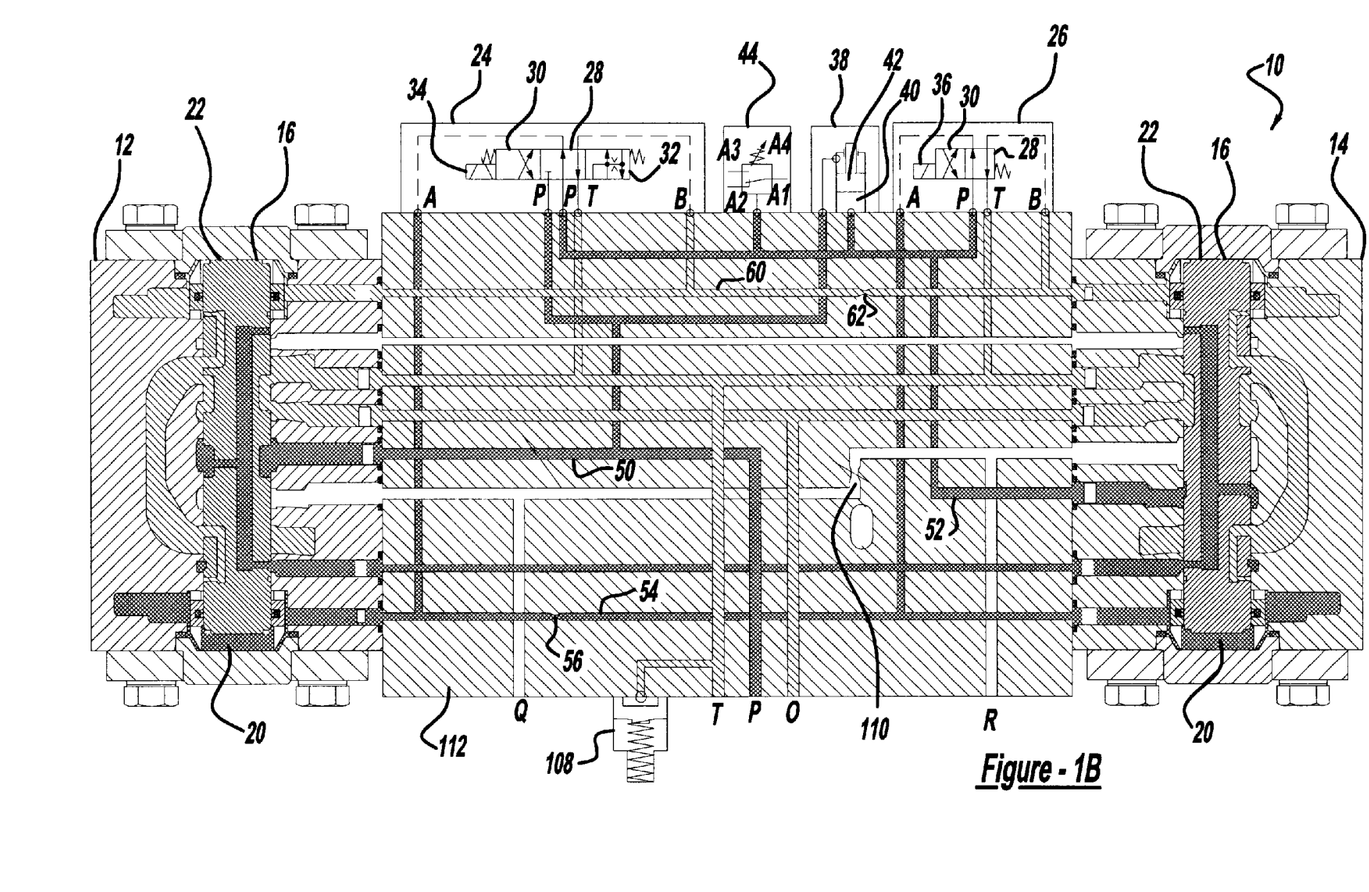
FIG. 1B is a cross-sectional view of the control valve system of FIG. 1A.

With reference to FIGS. 1A and 1B, control valve system 10 includes a main valve 12 and a main valve 14. Main valves 12 and 14 control fluid flow between an inlet P at a predetermined inlet pressure, an exhaust T which is a return to tank for a hydraulic control valve system or an exhaust for a pneumatic control valve system, and an outlet O which provides an outlet pressure to a device to be controlled. As will be defined in greater detail, each main valve 12, 14 is displaceable between a deactuated position 16 and an actuated position 18. With respect to main valve 12, main valve 12 assumes the deactuated position 16 when shifted toward the left and the actuated position 18 when shifted toward the right. With respect to main valve 14, main valve 14 assumes the deactuated position 16 when shifted toward the right and the actuated position 18 when shifted toward the left. Main valves 12 and 14 shift to the deactuated position 16 upon application of a pilot pressure to a pilot input 20. Similarly, main valves 12 and 14 shift towards the actuated position upon application of a pilot pressure to pilot input 22.

A pilot pressure is supplied through a pair of pilot valves 24 and 26. Pilot valve 24 is embodied as a double solenoid, 3 position, center return valve. Pilot valve 26 is embodied as a single solenoid, two position valve. Pilot valve 24 assumes one of a deactuated position 28, an actuated position 30, and a reset position 32. A double solenoid 34 displaces pilot valve 26 from a center, deactuated position 28 towards one of the actuated position 30 or reset position 32. Pilot valve 26 includes a deactuated position 28 and an actuated position 30. Pilot valve 26 is normally in the deactuated position 28. Upon activation of solenoid 36, pilot valve 26 is displaced toward actuated position 30.

Control valve system 10 also includes a timing chamber 38 which is embodied as a hydraulic cylinder 40 having a piston 42 which is displaced in response to fluid pressure. The timing chamber 38 uses the hydraulic fluid to load a timing piston for insuring an even pressure for the hydraulic fluid during the hereindescribed timing function. This eliminates a decrease in pressure that may otherwise exist by using a spring or gas accumulator. Further, the internal volume of the chamber is adjustable by adding spacers (not shown) to the piston for enabling the control valve system 10 to operate at any particular pressure and yield the exact time difference desired to indicate a failure. An optional pressure switch 44 senses pressure in the hydraulic control valve system 10, as will be described in greater detail herein. The pressure switch 44 is in electrical communication with a signal mechanism (not shown) for signaling a fault situation of the control valve system 10.

An accumulator shock damper 108 is optionally provided and is in fluid communication with a tank line that exhausts to tank T. The tank line selectively experiences system pressure. Therefore, to avoid shock through the tank line, shock damper 108 enables dampened volume expansion of the tank line as system pressure is applied to and removed from the tank line. Preferably shock damper 108 is attached to or in close proximity to the valve body to absorb shock closer to the source. Because the tank attached to the tank line may be located remotely from the valve body. In this manner, shock damper 108 absorbs volume expansion prior to entry into the fluid passage to tank downstream of the valve body.

The control valve system 10 may optionally include a variable restrictor 110 disposed between port B of main valve 12 and port P of main valve 14. Restrictor 110 operates as a cut-off to enable the flow of fluid to port Q, a restrictor to vary fluid flow between main valves, or a fully open passage between the main valves. Also optionally provided are ports Q and R operably disposed on either side of restrictor 110. Ports Q and R are adapted to be attached to external mechanisms (not shown) for selectively operating the mechanisms. In the case of use of ports Q and R, restrictor 110 may be removed and replaced with a plug (not shown) so that oil flows to port Q, to tile device, and back to port R. Thus, the other control device may independently control the flow of oil, or even stop it, without affecting the supply of pilot oil that controls the valve system 10 circuit.

FIGS. 1A and 1B, depict control valve system 10 in a normal, deactivated position. In this position, inlet fluid pressure supplied at inlet P is applied directly to port P of main valve 12, port P1 of pilot valve 24, and the upper port U of timing chamber 38 via a passage 50. The fluid pressure applied to port P of main valve 12 is output through port C of main valve 12 and into port D of main valve 14 and out through port A of main valve 14. The fluid pressure output from port A is input to ports P of pilot valves 24, 26 and to lower port L of timing chamber 38, as well as to the sensing port of pressure switch 44.

With respect to pilot valve 24, inlet pressure at port P is output from port A of pilot valve 24 and input to pilot input 20 of main valve 12 to displace main valve 12 to deactuated position 16. Similarly, pilot pressure at port P of pilot valve 26 is output from port A of pilot valve 26 and input to the pilot input 20 of main valve 14 to displace main valve 14 to deactuated position 16. The output from the respective ports A of pilot valves 24, 26 is interconnected by a passage 54 via a restrictor 56.

With main valves 12, 14 and pilot valves 24, 28 in the positions of FIG. 1, the outlet O is connected to tank or exhaust through ports A and T of main valve 12 and ports B and T of main valve 14. Also in this position, pilot inputs 22 of main valves 12, 14 are connected to tank T through internal connections of main valves 12, 14, through restrictors 58, and also through respective pilot valves 24, 26, by flowing through ports B and T of pilot valves 24, 26 to tank T. Ports B of pilot valves 24, 26 are interconnected by a passage 60 via a restrictor 62.

In the configuration of FIGS. 1A and 1B, fluid pressure is applied to both the upper port U and lower port L of timing chamber 38. Lower port L has a larger surface area than upper port U so that if pilot pressure is applied equally to, upper port U and lower port L, cylinder 42 is displaced upward in response to a resultant force differential, thereby filing the volume beneath cylinder 42 with hydraulic fluid. As will be described, this volume will be used to monitor the time period of shifting between main valves 12, 14.

With reference to FIG. 1B, a cross-section of a control valve system 10 is shown in the deactuated position as described hereinabove with reference to FIG. 1A. Main valves 12, 14 are disposed on either side of a control valve body 112 having the various hereindescribed fluid passages disposed therethrough. Both main valves 12, 14 and pilot valves 24, 26 are in their respective deactuated positions 16, 28. As described previously, with reference to FIG. 1A, inlet fluid pressure supplied at inlet P is applied to port P of main valve 12 is output through port C and into port D of main valve 14 and out through port A of main valve 14. The fluid pressure output from port A is input to ports P of pilot valves 24, 26 and to lower port L of timing chamber 38, as well as to the sensing port of pressure switch 44.

With respect to pilot valve 24, inlet pressure at port P is output from port A of pilot valve 24 and input to pilot input 20 of main valve 12 to displace main valve 12 to deactuated position 16. Similarly, pilot pressure at port P of pilot valve 26 is output from port A of pilot valve 26 and input to the pilot input 20 of main valve 14 to displace main valve 14 to deactuated position 16. The output from the respective ports A of pilot valves 24, 26 is interconnected by passage 54 via restrictor 56. Outlet O is connected to tank or exhaust through ports A and T of main valve 12 and ports B and T of main valve. Pilot inputs 22 of main valves 12, 14 are connected to tank T through internal connections of main valves 12, 14 through restrictors 58, and also through respective pilot valves 24, 26 by flowing through ports B and T of pilot valves 24, 26 to tank T. Ports B of pilot valves 24, 26 are interconnected by passage 60 via restrictor 62. Fluid pressure is applied to both the upper port U and lower port L of timing chamber 38.

Figure 2:
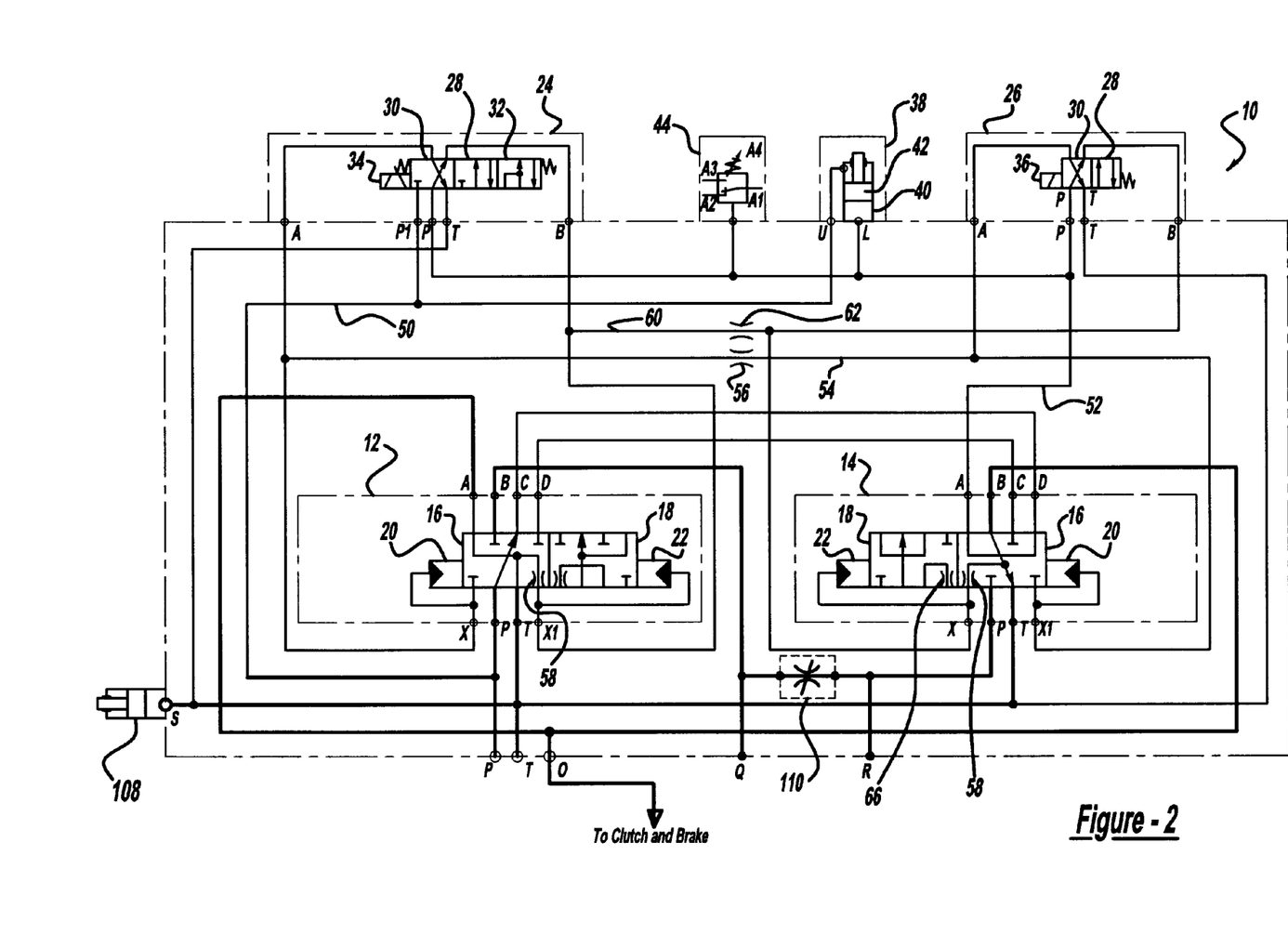
FIG. 2 is a schematic circuit diagram of the control valve shown during the period when the pilot valves have shifted to an actuated position and the main valves have not yet shifted to their actuated position.

In order to displace main valves 12, 14 from deactuated positions 16 to the actuated positions 18, the respective pilot valves 24, 26 must be displaced from deactuated positions 28 to actuated positions 30. FIG. 2 depicts an intermediate configuration where pilot valves 24, 26 have been displaced to actuated positions 30, and main valves 12, 14 have not yet shifted from deactuated positions 16 to actuated positions 18.

Once pilot valves 24, 26 have shifted to their actuated positions 30, inlet pressure P is output at port C of main valve 12 to port D of main valve 14 and out from port A of main valve 14 to passage 52. Passage 52 supplies fluid pressure to ports P of pilot valves 24, 26. The pilot pressure is output from ports B of pilot valves 24, 26. Port B of pilot valve 24 supplies a pilot pressure to port X1 of main valve 12 and in turn to pilot input 22, thereby initiating displacement of main valve 12 from deactuated position 16 to actuated position 18. Similarly, port B of pilot valve 26 supplies a pilot pressure to port X of main valve 14. Port X supplies a pilot pressure to pilot input 22, which initiates displacement of main valve 14 from deactuated position 16 to actuated position 18.

As discussed above and as can be seen in FIG. 2, in this initial configuration, the pilot pressure at ports X1, X of respective main valves 12, 14 is connected internally to the tank or exhaust T through restrictor 58. Restrictor 58, however, supplies a sufficient back-pressure to enable the pilot pressure to displace main valves 12, 14 from deactuated position 16 to actuated position 18, so long as such displacement occurs within a predetermined time period. During this initial transition, no pressure is supplied at outlet O of control valve system 10 because outlet O connects to tank through ports A, B of main valves 12, 14.

Figure 3:
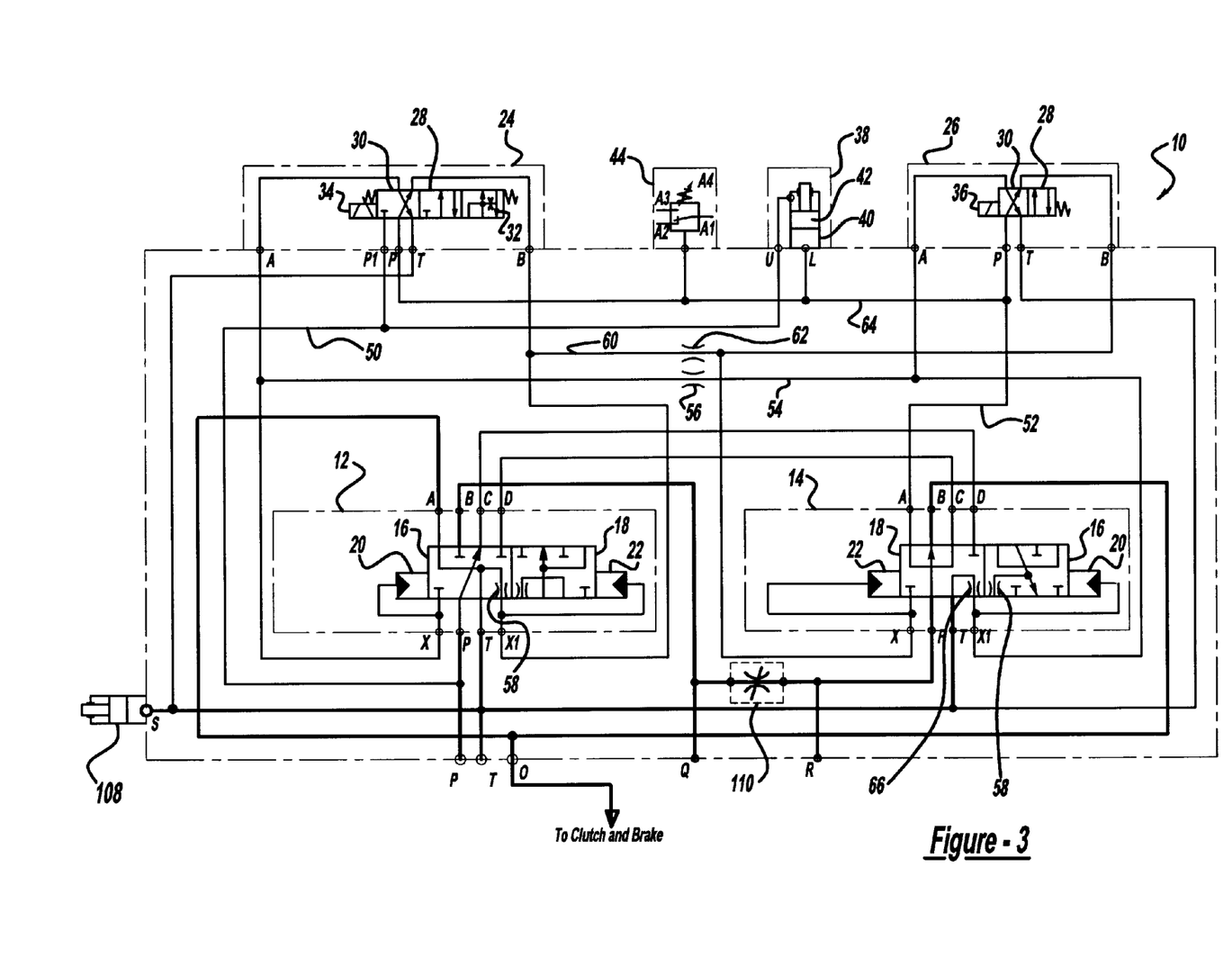
FIG. 3 is a schematic diagram of the control valve during the period when both pilot valves have shifted to an actuated position and one main valve has shifted to an actuated position.

With reference to FIG. 3, once one of the main valves, main valve 14 has shifted to actuated position 18, while main valve 12 has yet to shift to actuated position 18 and remains in deactuated position 16, timing chamber 38 provides pilot pressure to shift the yet unshifted valve from deactuated position 16 to the actuated position 18. FIG. 3 shows pilot valves 24, 26 in their respective actuated positions 30. Main valve 14 is in actuated position 18, while main valve 12 has yet to shift from deactuated position 16.

In this intermediate condition, port A of main valve 14 receives no fluid because it is connected to port D of main valve 12, which is blocked. Port A of main valve 14 connects to port P of pilot valves 24, 26. Because port D of main valve 12 receives no fluid pressure, fluid pressure to pilot valves 24, 26 is cut off. However, fluid pressure input to port U of timing chamber 38 displaces cylinder 42 downwardly, thereby generating an outlet pressure at lower port L of timing chamber 38. This outlet pressure is applied to port P of pilot valve 24, which in turn supplies pilot pressure to port X1 of main valve 12. The pilot pressure at port X1 of main valve 12 is supplied to pilot input 22, thereby displacing main valve 12 to actuated position 18. As described above, restrictor 58 provides a back-pressure to prevent complete venting to pilot pressure to tank T through ports A and T of main valve 12.

The volume beneath cylinder 42 of timing chamber 38 is preferably selected to ensure that main valves 12, 14 shift within a predetermined time period. In other words, once one of main valves 12, 14 has shifted, the other of main valve 12, 14 must shift within a predetermined time period. The predetermined time period is determined in accordance with the fluid volume stored beneath cylinder 42 of timing chamber 38. If the second shifting main valve does not shift within a predetermined time period, control valve system 10 achieves a locked-out state, as will be described with respect to FIG. 5A. As shown in FIG. 3, if main valve 12 does not shift within the predetermined time period, the internal path from port X1 to ports A and T of main valve 12 will eventually bleed off a sufficient amount of fluid pressure to tank.

Figure 4A:
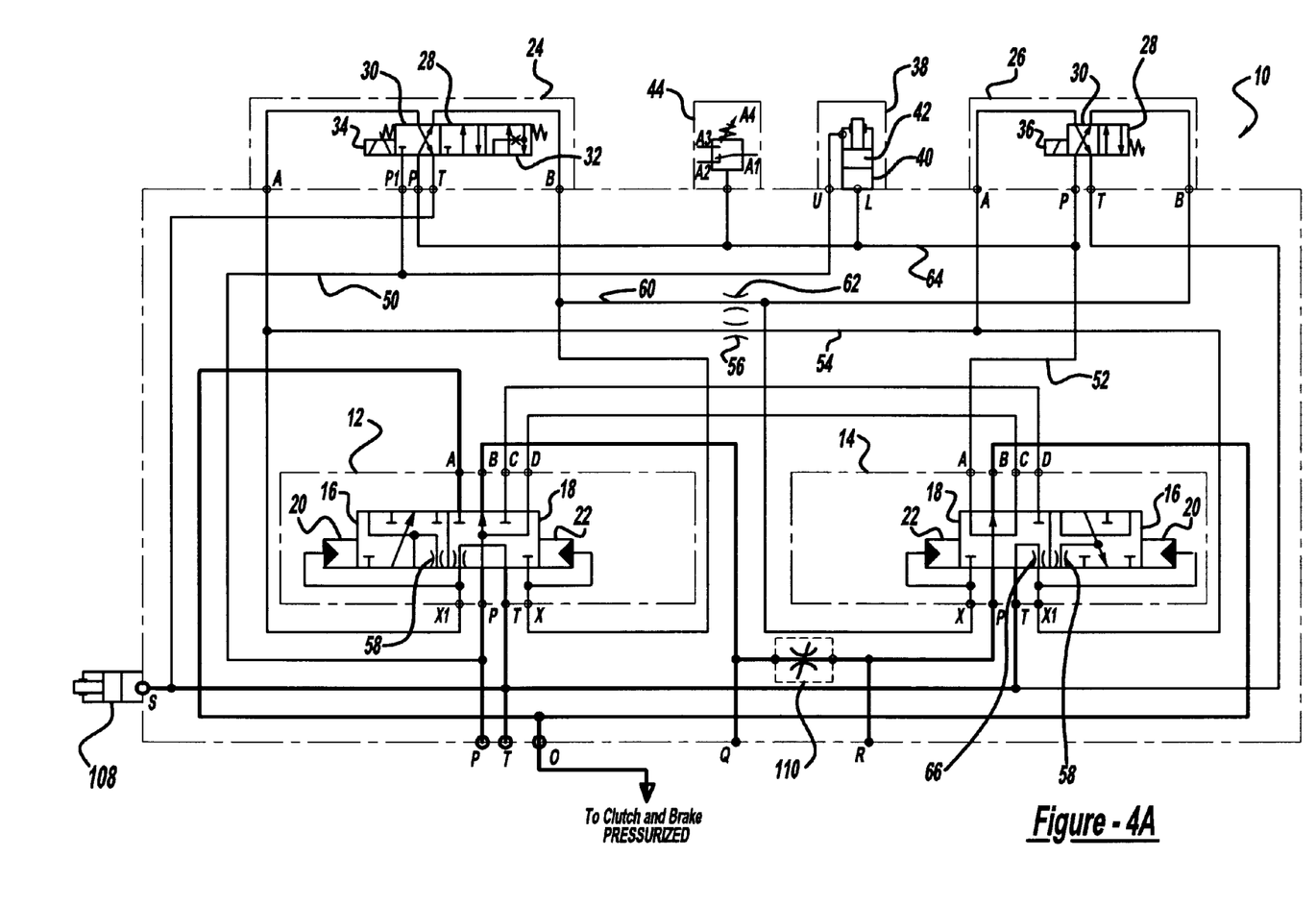
FIG. 4A is a schematic circuit diagram of the control valve system of the present invention shown in an actuated position.
Figure 4B:
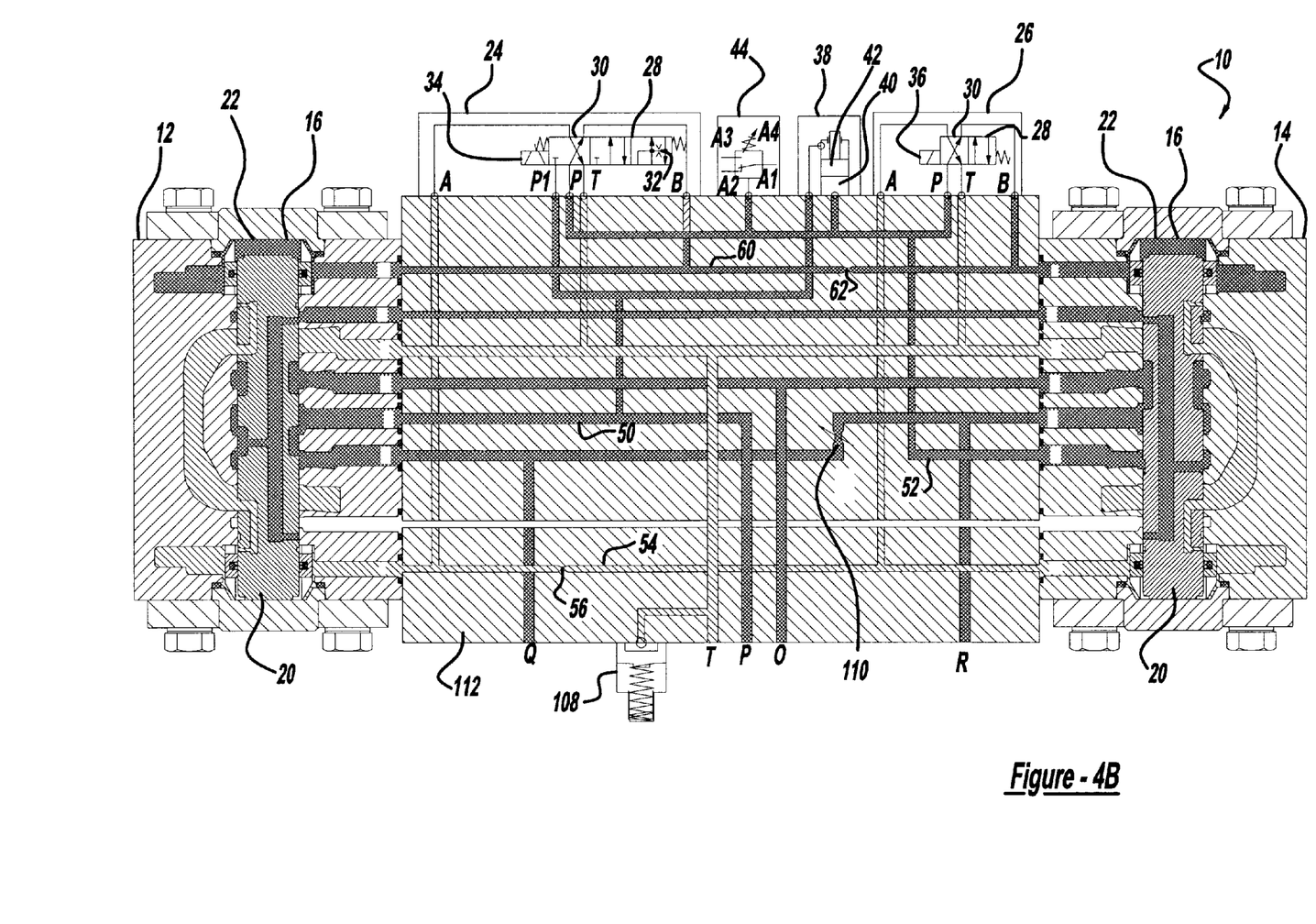
FIG. 4B is a cross-sectional view of the control valve system of FIG. 4A.

If main valves 12, 14 shift within the predetermined time period, control valve system 10 achieves a normal configuration as shown in FIGS. 4A and 4B. In a normal configuration, pilot pressure at inlet port P is applied to port P of main valve 12 and to port B via an internal connection. Port B of main valve 12 connects to port P of main valve 14 which in turn connects to port B through an internal connection. The pressure at port B of main valve 14 is connected to the outlet O of control valve system 10. This supplies the working pressure to operate the clutch, brake, or other machine element.

Returning to main valve 12, inlet pressure at port P is also applied to port D through an internal connection. The fluid pressure at port D of main valve 12 is applied to port C of main valve 14 and to port A of main valve 14 through an internal connection. From port A, fluid pressure is applied to ports P of pilot valves 24, 26. Pilot valves 24, 26 provide fluid pressure to ports B. With respect to pilot valve 24, fluid pressure at port B is applied to port X1 of main valve 12, which in turn provides a pilot pressure to pilot input 22 of main valve 12. Similarly, fluid pressure supplied at port B of pilot valve 26 is applied to port X of main valve 14, which in turn supplies pilot pressure to pilot input 22 of main valve 14.

The inlet pressure applied at inlet P of control valve system 10 is also applied directly to the upper port U of timing chamber 38. The pressure output at port A of main valve 14 is applied to the lower port L of timing chamber 38. As described above, because lower port L has a greater surface area, a greater force is supplied to the bottom of piston 42 then to the top of piston 42, thereby displacing piston 42 upwardly and providing a fluid volume within timing chamber 38 for operation as described above.

Also in the configuration of FIGS. 4A and 4B, pilot inputs 20 of main valves 12, 14 are vented to tank through the A and T ports of respective pilot valves 24, 26. This prevents displacement of main valves 12, 14 to the deactuated position 16.

Figure 5A:
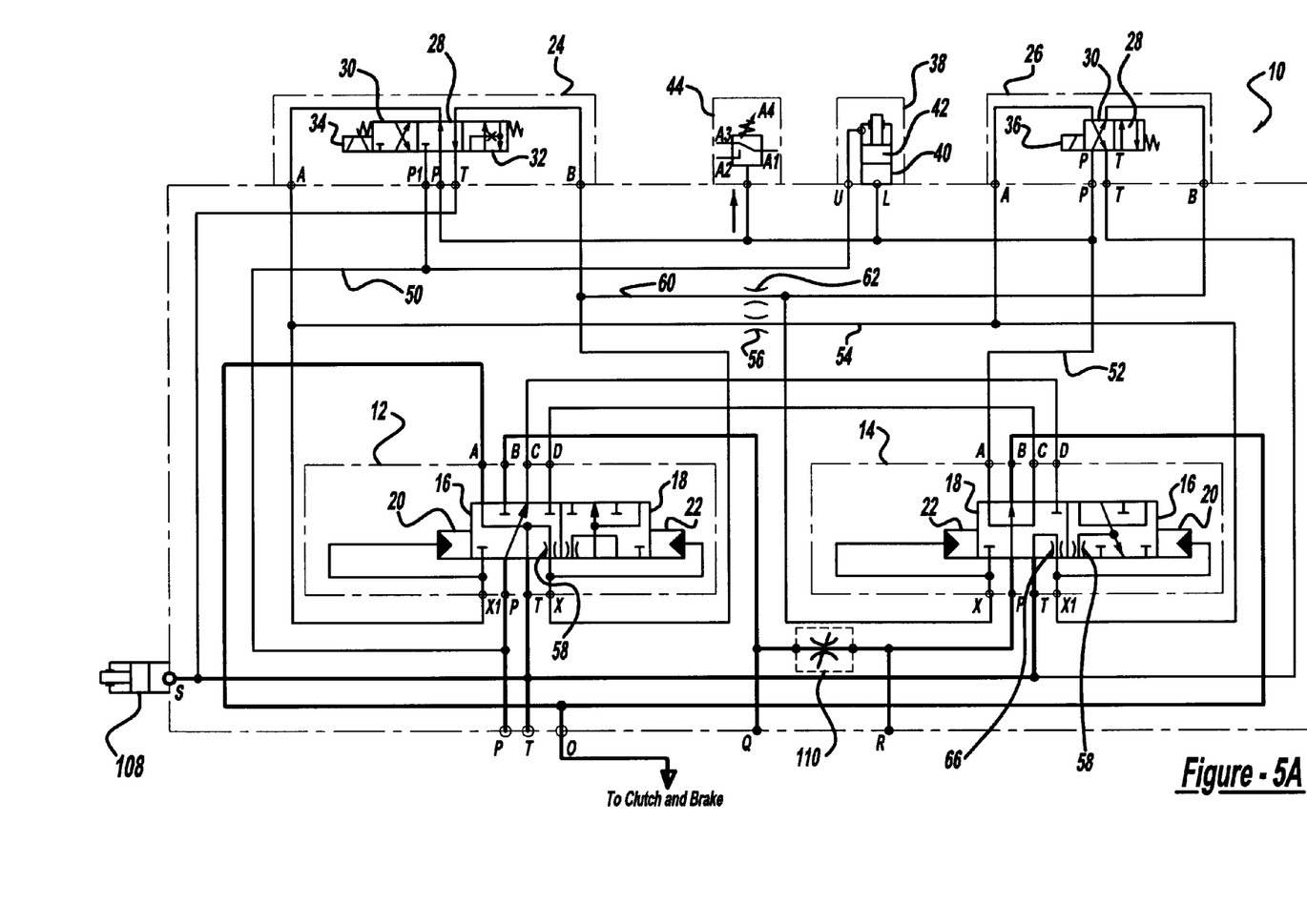
FIG. 5A is a schematic circuit diagram of the control valve system of the present invention shown in a locked out position.

While FIGS. 1A–4B generally describe normal operation of control valve system 10, FIG. 5A depicts a configuration which control valve system 10 assumes when a fault condition occurs. A fault condition can occur through one of several occurrences. In particular, one of pilot valves 24, 26 may be displaced to actuated position 30 while the other pilot valve 24, 26 remains in deactuated position 28. Typically, such an occurrence will result in the main valve 12, 14 associated with the actuated pilot valve displacing to actuated position 18 while the other main valve 12, 14 remains in the deactuated position 16. The pilot valves 24, 26 may operate in this manner when the operator actuates only one of the two pilot valves 24, 26, when the operator does not actuate the pilot valves 24, 26 within a predetermined time period, when the pilot valves 24, 26 are actuated within a predetermined time period by the operator, but one of the pilot valves fails to shift properly. Alternatively, analogous operation of main valves 12, 14 can result in a fault condition.

Figure 5B:
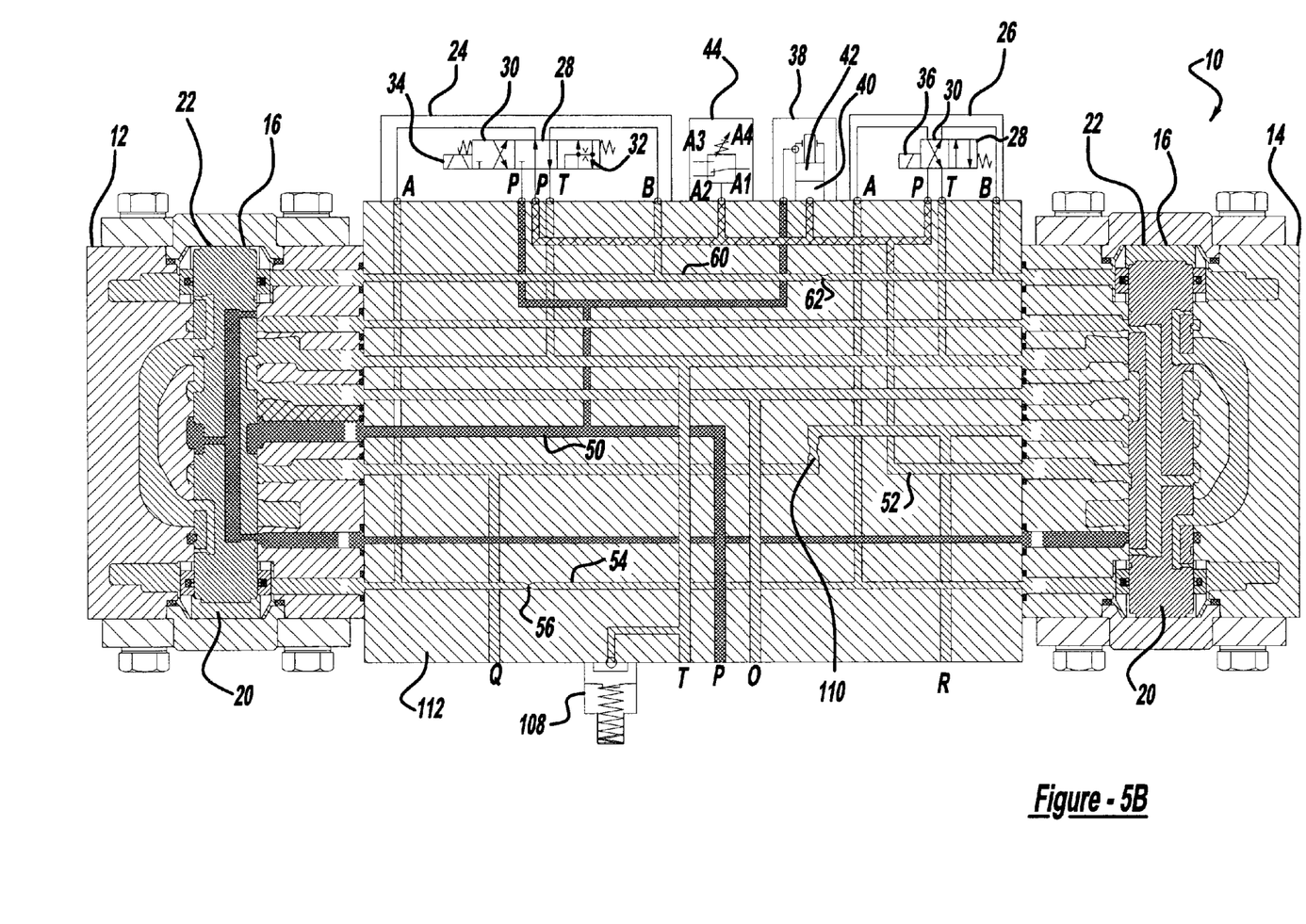
FIG. 5B is a cross-sectional view of the control valve system of FIG. 5A.

As shown in FIGS. 5A and 5B, pilot valve 24 is in deactuated position 28, and pilot valve 26 is in actuated position 30. This configuration will place main valve 12 in deactuated position 16, and will shift main valve 14 to actuated position 18. In this configuration, inlet fluid pressure supplied at inlet P is applied to port P of main valve 12 and exits at port C at main valve 12 through an internal connection. The fluid pressure at port C is applied to port D of main valve 14, which is simply a blocked connection. Thus, no pilot pressure is applied to either of ports P of pilot valves 24, 26.

In this condition, main valves 12, 14 remain in their current state in which main valve 12 is in deactuated position 16 and main valve 14 is in an actuated position 18. Pilot input 20 of main valve 12 thus experiences an intermediate pressure. Pilot input 22 of main valve 12 is vented to tank through port X of main valve 12 and ports B and T of pilot valve 24. Pilot input 22 of main valve 12 is also vented to tank through restrictor 58 and port A of main valve 12. Similarly, pilot input 20 of main valve 14 is vented to tank through ports A and T of pilot valve 26. Pilot input 20 of main valve 14 is also vented to tank through restrictor 66 and port T of main valve 14. Pilot input 22 of main valve 14 also experiences an intermediate pressure. When in this position switch 44 is displaced to contact A3.

Once control valve system 10 achieves a fault condition, the valve cannot be operated until a reset has occurred. Until a reset occurs, the valve is locked-out from further operation.

Figure 6A:
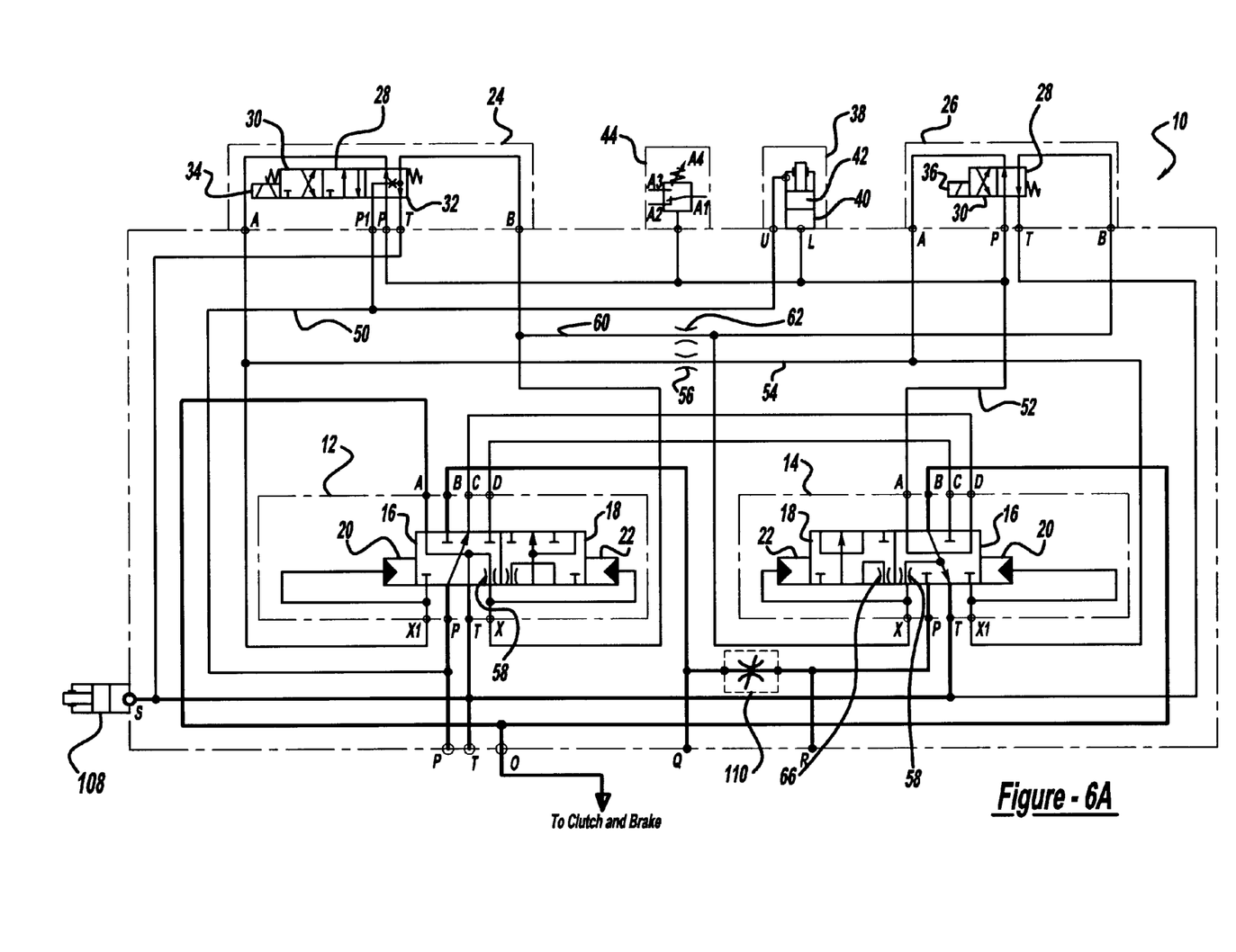
FIG. 6A is a schematic circuit diagram of the control valve system of the present invention shown in a reset position.
Figure 6B:
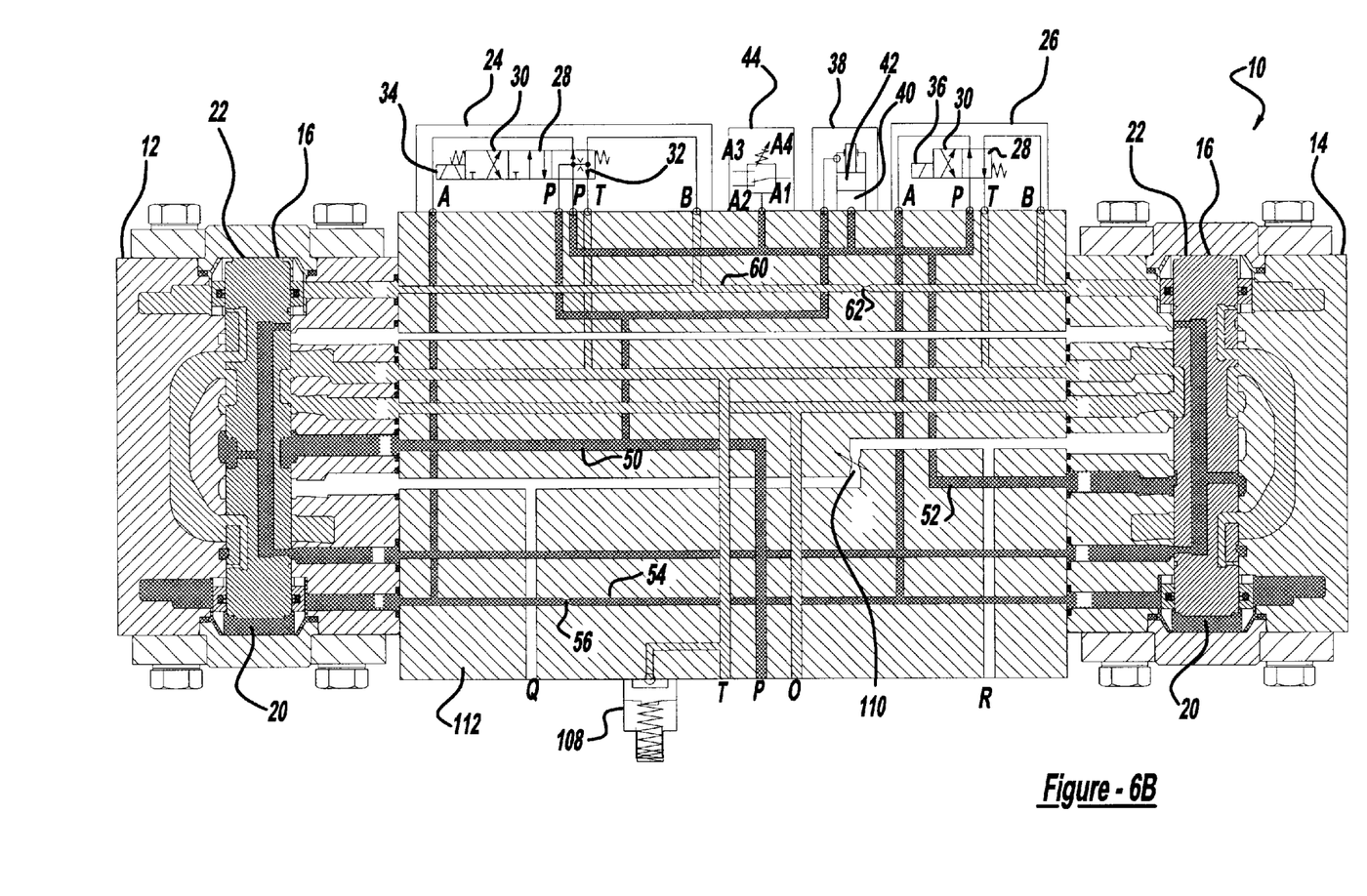
FIG. 6B is a cross-sectional view of the control valve system of FIG. 6A.

FIGS. 6A and 6B depict control valve system 10 in a reset configuration. A reset occurs by displacing pilot valve 24 to reset position 32 which causes main valves 12, 14 to return to deactuated positions 16. Displacing pilot valve 24 to reset position 32 supplies fluid pressure to port A, through input port P1, of pilot valve 24. The output from port A of pilot valve 24 is applied to pilot input 20 through port X of main valve 12 to displace main valve 12 to deactuated position 16. Fluid pressure at inlet P is also applied to port A of pilot valve 26, from port P1 of pilot valve 24. Fluid pressure at port A of pilot valve 26 is applied to pilot input 20 of main valve 14 through port X1. This displaces main valve 14 to deactuated position 16. Fluid pressure is also supplied from port P of pilot valve 24 to lower port L of timing chamber 38 to displace cylinder 42 upward overcoming the force of fluid pressure supplied at upper port U of timing chamber 38. This resets timing chamber 38 for operation in a normal mode as well.

Pilot valve 24 provides both a pilot function and a reset function. Pilot valve 24 has opposing solenoids, one for displacement to a reset position and one for displacement to an actuated position, when both the reset and the actuating solenoids are energized, the resultant force of each solenoid cancels the other to maintain pilot valve 24 in the deactuated position 28. This provides a natural interlock to ensure that the reset signal must be removed and that the RUW signal must be removed to reset the valve. Removing the reset signal prevents a faulting valve from operating. Removing the RUW signal enables the reset to occur.

Also in FIGS. 6A and 6B, pilot inputs 22 of main valves 12, 14, are vented to tank through ports B and T to respective pilot valves 24, 26. Pilot inputs 22 of main valves 12, 14 are also vented to tank through restrictor 58 and respective ports T. After sufficient time has been provided to displace main valves 12, 14 to deactuated positions 16, solenoid 34 is deactivated to displace pilot valve 24 from reset position 32 to deactuated position 28, thereby achieving the normal, deactivation configuration of FIGS. 1A and 1B.

Figure 7:
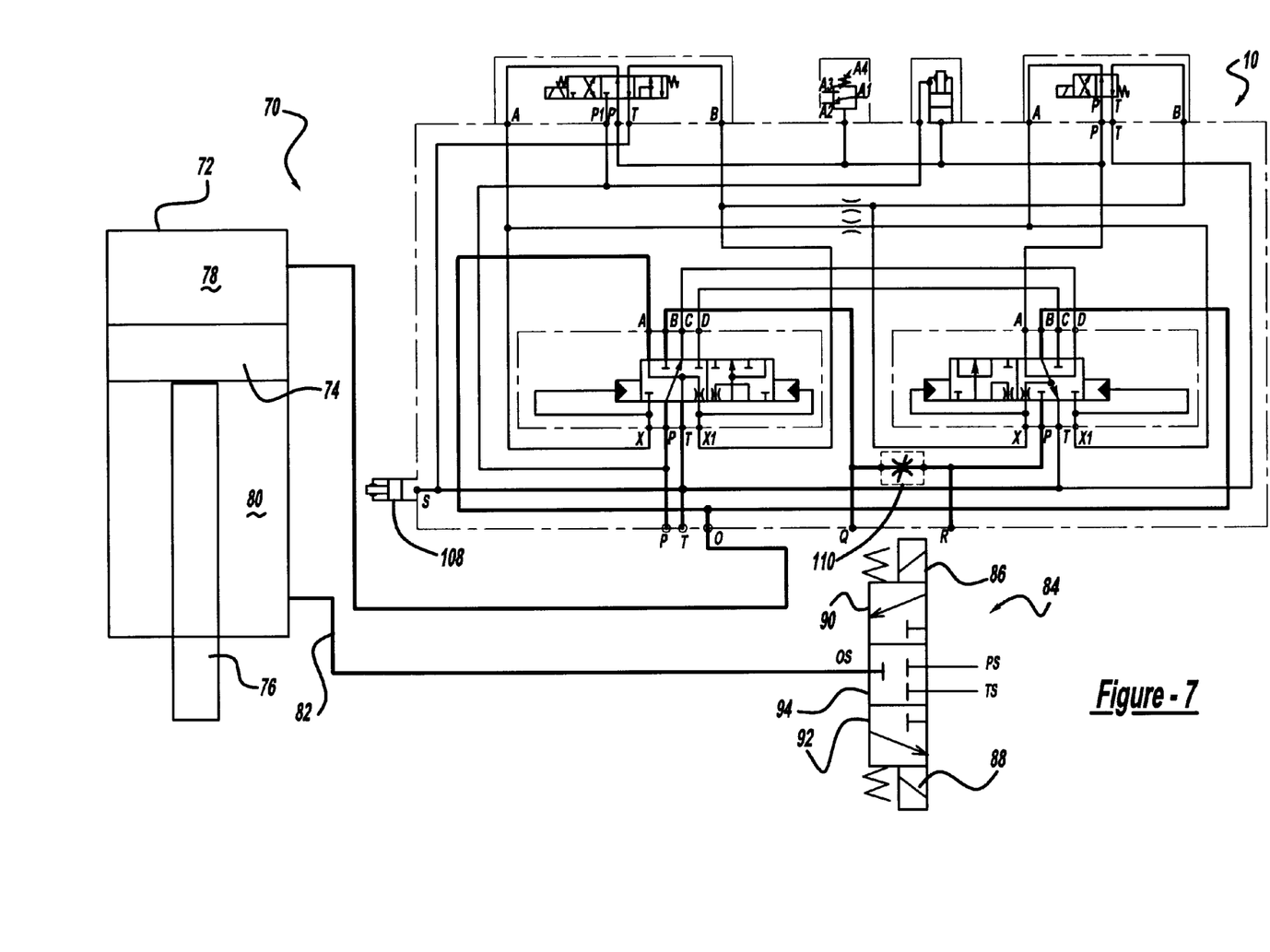
FIG. 7 is a schematic circuit diagram of the control valve system of the present invention for operating a ram press.

FIG. 7 depicts a ram press control system 70 utilizing control valve system 10 of FIGS. 1–6. Control valve system 10 of FIG. 7 operates as described above. The outlet O supplies a control pressure to a cylinder 72 which includes a piston 74 and a ram 76. The fluid pressure supplied by outlet O to an upper portion 78 of cylinder 72 generates a downward force which displaces piston 74 and attached ram 76 downwardly. The lower portion 80 of cylinder 72 includes a fluid volume which connects to a passage 82 which in turn connects to a solenoid valve 84. As embodied herein, solenoid valve 84 is a normally centered, three position solenoid valve having an inlet port PS, and an outlet port OS, and an exhaust port TS. A raising solenoid 86 displaces solenoid valve 84 to a raising position 90, and a lowering solenoid 88 displaces solenoid valve 84 to a lowering position 92. In the center position 94, outlet port OS is cut off from either ports either inlet port PS or exhaust port TS, thereby preventing fluid flow into or out of lower portion 80.

When raising solenoid 86 is energized, fluid pressure at inlet port PS is applied to outlet port OS and into lower portion 80. The fluid pressure in lower portion 80 displaces cylinder 74 upwardly, so long as fluid pressure in upper portion 78 does not oppose such displacement. When lowering solenoid 88 is energized, solenoid valve 84 is displaced to lowering position 92. In the lowering position, fluid pressure in lower portion 80 is drained through exhaust port TS in order to enable piston 74 to lower in cylinder 72.

Figure 8:
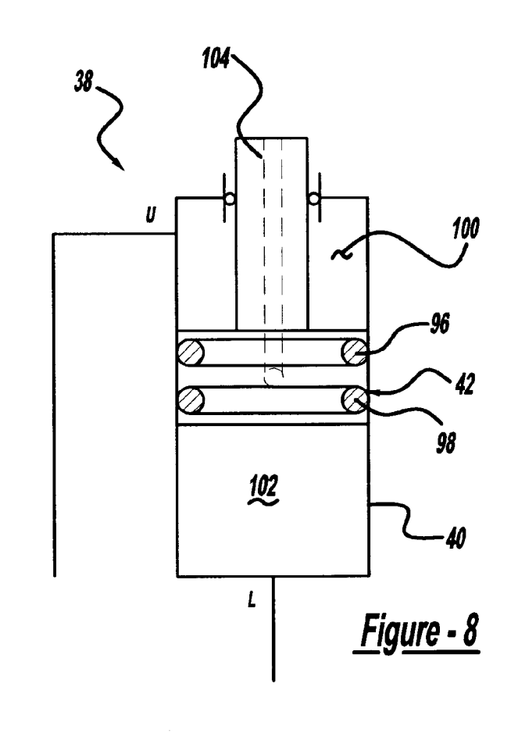
FIG. 8 is a diagram of the timing chamber of FIGS. 1–6.

FIG. 8 depicts an expanded view of timing chamber 38. Timing chamber 38 includes a piston 42 having one or a number of seals 96, 98 to prevent leakage between upper portion 100 and lower portion 102 of timing chamber 38. A drain port 104 provides an exhaust in case one of the seals 96, 98 leaks. Drain port 104 prevents additional fluid flow through timing chamber 38 if seals 96, 98 leak.

Figure 9:
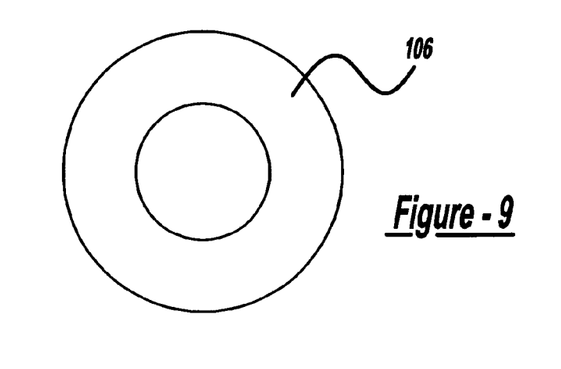
FIG. 9 is a drawing of a spacer for use in the timing chamber of FIG. 7.
Figure 10:
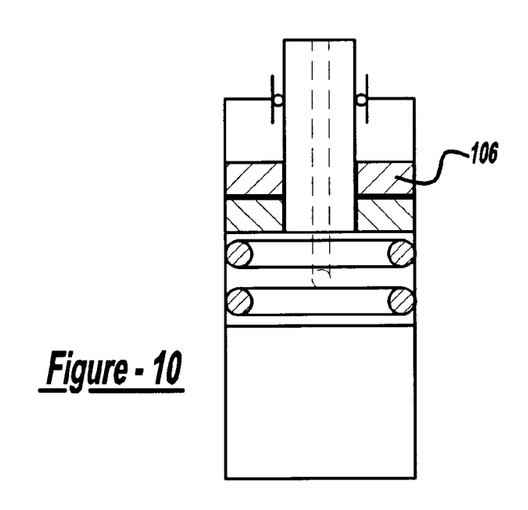
FIG. 10 is a timing chamber having spacers inserted in order to vary the timing.

One feature of timing chamber 38 is the ability to vary the timing by inserting spacers 106, as shown in FIG. 9, on top of piston 42. As shown in FIGS. 9 and 10, by mounting a plurality of spacers 106 on top of piston 42, thereby preventing piston 42 from displacing all the way to the top of cylinder 40. As shown in FIG. 10, the addition of spacers reduces the time between which main valves 12, 14 must shift in order to prevent lock-out of fluid control valve system 10. Spacers of varying configurations may be used. Timing is varied by controlling the travel of piston 42. Any mechanism for restricting travel will vary the volume and consequently vary the timing. Thus, spacers any be installed on either side of piston 42.

While the invention has been described in its presently preferred form, it is to be understood that there are numerous applications and implementations for the present invention. Accordingly, the invention is capable of modification and changes without departing from the spirit of the invention as set forth in the appended claims.

What is claimed is:

1. A fluid control valve system operably interconnecting a source of pressurized working fluid, a working element and, an exhaust, comprising:
    an inlet providing fluid communication between the source of pressurized fluid and, the fluid control valve;
    a work outlet providing fluid communication between the fluid control valve and, the working element;
    an exhaust outlet providing fluid communication between the fluid control valve and, the exhaust;
    a first control valve disposed within a first passage for selectively enabling fluid communication between said inlet and, said outlet;
    a first pilot valve disposed within a second passage for selectively actuating said first control valve, said first and, second passages in selective fluid communication, said first pilot valve actuable to operate the fluid control valve system in one of either a deactuated mode, a normal mode, a lock-out mode and, a reset mode; and
    a timing device operably disposed between said first and, second passages for initiating said lock-out mode when actuation of said first control valve fails to occur within a predetermined time period after initiation by said first pilot valve, thereby prohibiting actuation of said first control valve.

2. The fluid control valve system of claim 1, further comprising a second control valve disposed within said first passage and, in fluid communication with said first control valve and, a second pilot valve disposed within said second passage and, in fluid communication with said first pilot valve, said second pilot valve actuable with said first pilot valve for operating the fluid control valve system in one of either said deactuated mode, said normal mode, said lock-out mode and, said reset mode.

3. The fluid control valve system of claim 2, wherein in said deactuated mode said first pilot valve is positioned to prohibit flow of an actuation pilot pressure to said first control valve, said second pilot valve is positioned to enable a flow of deactuation pilot pressure to said first and, second control valves for maintaining said first and, second control valves in a deactuated position.

4. The fluid control valve system of claim 2, wherein in said normal mode said second pilot valve is positioned to enable a flow of actuation pilot pressure to each of said first and, second control valves for actuating said first and, second control valves to enable pressurized fluid flow from the source of pressurized working fluid to the working element, through the work outlet.

5. The fluid control valve system of claim 2, wherein in said lock-out mode said first and, second pilot valves are positioned to enable a flow of deactuation pilot pressure to said first control valve, thereby disconnecting the source or pressurized fluid from fluid communication with said work outlet.

6. The fluid control valve system of claim 2, wherein in said reset mode said first and, second pilot valves are positioned to enable a flow of deactuation pilot pressure to both said first and, second control valves.

7. The fluid control valve system of claim 2, wherein said timing means comprises a timing chamber for storing a volume of fluid, said timing chamber generating a fluid pressure to actuate one of said first and, second control valves following actuation of the other of said first and, second control valves, wherein said fluid pressure is applied for a predetermined time period to actuate said one control valve within said predetermined time period of actuation of said other control valve.

8. The fluid control valve system of claim 7, wherein said predetermined volume of fluid determines a time period in which said one of said first and, second control valves shifts from a deactuated position to an actuated position.

9. The fluid control valve system of claim 7, wherein said predetermined volume of fluid displaces one of said first and, second control valves from a deactuated position to an actuated position, and, wherein said one of said first and, second control valves must be displaced from said deactuated position to said actuated position before said predetermined volume is depleted from the fluid chamber.

10. The fluid control valve system of claim 7, wherein said predetermined volume of fluid ensures that said one of said first and, second control valves is displaced from a deactuated position to an actuated position within a predetermined time period.

11. The fluid control valve system of claim 7, further comprising a reset valve associated with one of the first and, second control valves, the reset valve displacing the one of the first control valves from the actuated position to the deactuated position.

12. The fluid control valve system of claim 2, further comprising a restrictor disposed along the first passage intermediate said first and, second control valves for restricting flow between the inlet and, the work outlet.

13. The fluid control valve system of claim 1, further comprising a shock damper in fluid communication with said second passage to compensate for sudden pressure shifts within the fluid control valve system.

14. A hydraulic valve control system, comprising:
    an inlet port supplying a fluid pressure;
    an outlet port;
    an exhaust port;
    a first main valve controlling fluid pressure between the inlet port and, the outlet port, wherein in a deactuated position, fluid pressure at the inlet port is cut off from the outlet port and, in an actuated position, fluid pressure at the inlet port is applied to the outlet port;
    a first pilot valve for controlling a pilot pressure to actuate and, deactuate the first main valve;
    a second main valve controlling fluid pressure between the inlet port and, the outlet port, wherein in a deactuated position, fluid pressure at the inlet port is cut off from the outlet port and, in an actuated position, fluid pressure at the inlet port is applied to the outlet port;
    a second pilot valve for controlling the pilot pressure to actuate and, deactuate the second main valve; and
    a timing chamber for storing a volume of fluid, the timing chamber generating a fluid pressure to actuate one of the main valves following actuation of the other of the main valves, wherein the fluid pressure is applied for a predetermined time period to actuate the one main valve within the predetermined time period of actuation of the other main valve.

15. The hydraulic valve control system of claim 14, wherein the first pilot valve has an actuated and, a deactuated position, wherein in the deactuated position, the pilot pressure is applied to the first main valve to displace the first main valve toward its deactuated position and, in the actuated position, pilot pressure is applied to the first main valve to displace the first main valve toward its actuated position.

16. The hydraulic valve control system of claim 14, wherein the second pilot valve has an actuated and, a deactuated position, wherein in the deactuated position, the pilot pressure is applied to the second main valve to displace the second main valve toward its deactuated position and, in the actuated position, pilot pressure is applied to the second main valve to displace the second main valve its actuated position.

17. The hydraulic valve control system of claim 14, wherein the volume of fluid in the timing chamber fails to actuate the one of the first and, second main valves if the first and, second main valves do not actuate within a predetermined time period.

18. The hydraulic valve control system of claim 14, wherein when one of the first main valve and, the second main valve are in an actuated position and, the other of the first main valve and, the second main valve is in a deactuated position for a predetermined time period, the hydraulic control valve system inhibits displacement of the first main valve and, the second main valve, thereby establishing a lock-out condition.

19. The hydraulic valve control system of claim 18, wherein one of the pilot valves includes a reset position, whereby when the hydraulic valve control system is in said lock-out condition displacement of the one pilot valve to the reset position causes at least one of the first and, second main valves to move to the deactuated position.

20. The hydraulic valve control system of claim 19, wherein when the first main valve and, second main valve are in an actuated position, the inlet pressure is applied to the outlet and, when one of the first main valve and, the second main valve is in the deactuated position, the outlet is connected to the exhaust.

21. The hydraulic valve control system of claim 14, wherein when the first main valve and, second main valve are in an actuated position, the inlet pressure is applied to the outlet and, when one of the first main valve and, second main valve is in the deactuated position, the outlet is connected to the exhaust.

22. The hydraulic valve control system of claim 14, further comprising a shock damper in fluid communication with the exhaust port to compensate for sudden pressure shifts therewithin.

23. The hydraulic valve control system of claim 14, further comprising a restrictor disposed between the first and, second main valves for restricting flow between the inlet port and, outlet port.

* * * * *